Oct. 4, 1966  J. F. LANCASTER  3,276,639
METERED DROP DISPENSER
Filed Dec. 21, 1964
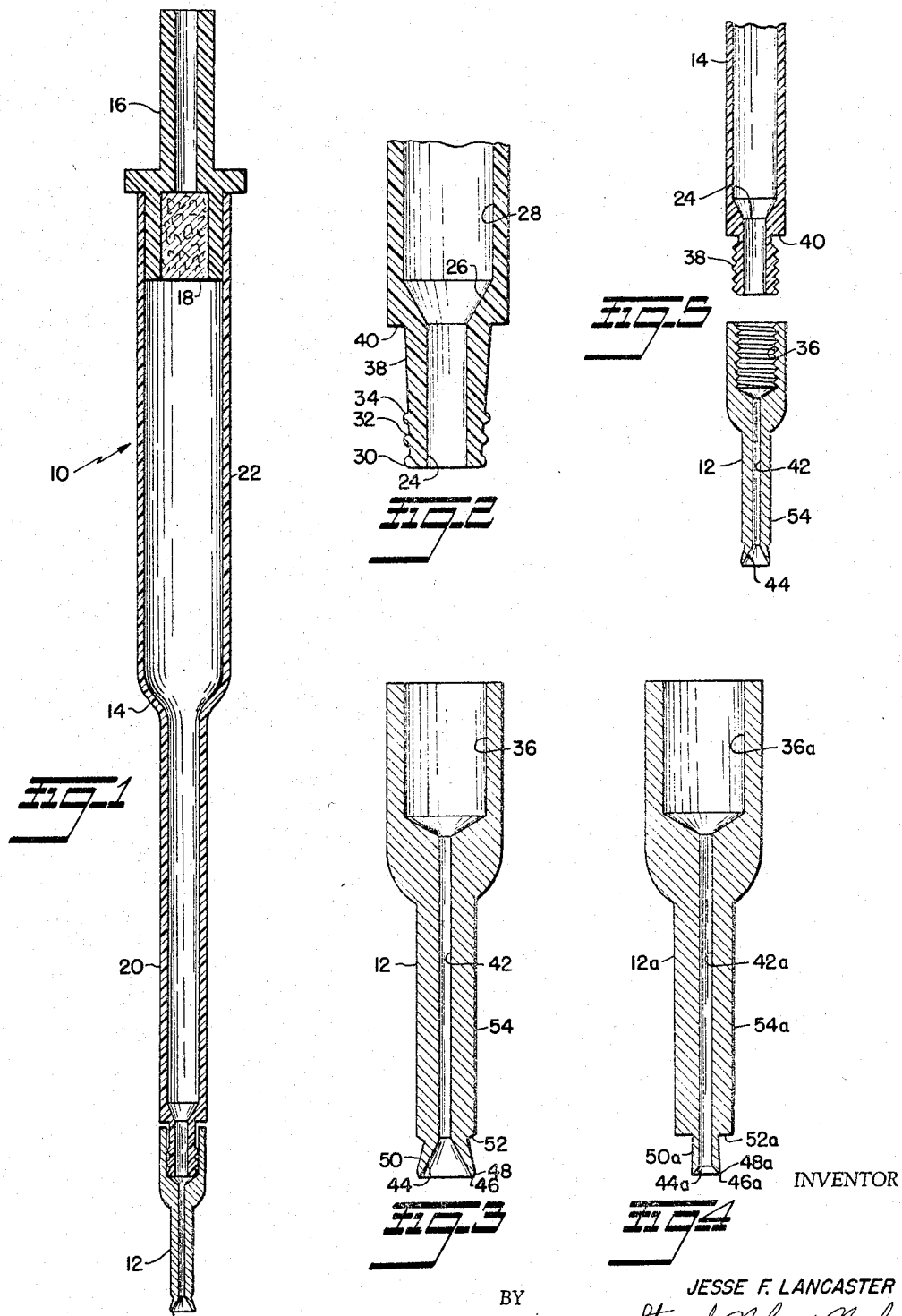
INVENTOR
JESSE F. LANCASTER
BY Strauch, Nolan & Neale
ATTORNEYS 3,276,639
Patented Oct. 4, 1966

3,276,639
METERED DROP DISPENSER
Jesse F. Lancaster, Great Falls, Va., assignor to Cooke Engineering Company, Alexandria, Va., a corporation of Delaware
Filed Dec. 21, 1964, Ser. No. 420,036
11 Claims. (Cl. 222—421)

This is a continuation-in-part of my co-pending application Serial No. 413,402, filed November 23, 1964, now abandoned, for Laboratory Apparatus. The present invention relates to improvements in laboratory apparatus and more particularly to improvements in apparatus for dispensing drops of liquid of uniform accurately predetermined volume. Such apparatus is extremely useful in practicing microtitration techniques as explained in an article entitled "Application of a Microtechnique to Viral Serological Investigation," by John Louis Sever appearing in volume 88, No. 3 of The Journal of Immunology, March 1962, published by The Williams & Wilkins Co. The apparatus originally used for dispensing drops in micro-titration techniques is that shown in French Patent No. 1,174,252 entitled "Serological Apparatus and Method for its Application," published March 9, 1959. This equipment was ineffective to produce drops of uniform volume or of accurately predetermined volumes. The apparatus most widely in use for this purpose in the United States prior to the present invention is that shown in co-pending application Serial No. 135,364 filed August 31, 1961 for Titration Apparatus by Alan A. Duff et al. owned by the assignee of this application.

The primary object of the present invention is to provide a pipette dropper assembly which, like that of said copending application, is effective to produce drops of uniform accurately predetermined volume but which is of such improved construction that it may be more readily and economically manufactured, may be more readily cleaned, and which is much more durable in use.

The manufacture of the unit as disclosed in said co-pending application Serial No. 135,364 presented two distinct problems, one in the fabrication of the plastic pipette or reservoir forming barrel and the other in the fabrication of the discharge end of the tubular metal element.

Since the tubular metal element was very small in external cross-section and fit within the opening in the bottom of the barrel, a very small diameter opening, .040 inch, had to be provided in the bottom of the barrel to receive this tubular element. To form this barrel by injection molding, of course, required a core pin of this diameter. The forces of the plastic material flowing about this tiny pin as the plastic material is injected into the mold would force the pin off center so that the hole for the tubular element is not aligned with the axis of the barrel.

In the fabrication of the tubular element from a small tube as shown in said co-pending application Serial No. 135,364, the discharge flare can be made either by inserting a tapered piece in the end of the tube or by a spinning process. In either of these two processes, however, it was found impossible to hold the dimensions on the diameter of the flared surface within the required tolerances necessary to provide the uniformity of drop volume without individual calibration of each tubular element. Further, in these forming processes, the internal cross-section of the tube at the juncture of the cylindrical bore with the conoidal flared drop forming surface frequently becomes distorted from perfect circularity and is reduced in diameter. As a result, it becomes impossible to clean the bore of the tubular element by passing a needle or other suitable cleaning tool through the bore. The reduction in diameter results from the fact that either of these processes involve axial pressure against the end of the tube to form the coniodal internally flared suface. There is therefore inherently a certain amount of upsetting of the metal in the portion of the tube immediately adjacent its juncture with the flared surface resulting in an increased wall thickness and reduction in diameter of the bore of the tubular element at that juncture.

A further problem which has been noted in dispensers as constructed in accord with the disclosure of said co-pending application Serial No. 135,364 is that when the frustoconical surface of the tubular element is formed by flaring the end of the tube, the extreme edge of the tube becomes extremely thin in wall thickness due to the stretching of the material which occurred at the edge as the frustoconial surface is formed. This edge is so thin in fact that, in actual practice, extreme care must be exercised in laying one of these prior dispensers upon a work surface in a laboratory or in placing a group of them together in a tray for sterilizing in an autoclave to avoid bending the edge from its intended circular form and thereby destroying the calibration of the dispenser.

A further disadvantage which has been noted in the prior construction of said co-pending application Serial No. 135,364 results from the differences in the coefficents of expansion of the stainless steel tubular dropper element and the plastic of the barrel. With the tubular element received within a bore in the plastic barrel, as in the prior construction, when the assembly is placed in an autoclave, the metal will expand more and more rapidly than the plastic as the temperature is increased so that the tubular element tends to stretch or elastically deform the surrounding portion of the plastic barrel. While the barrel will contract to a certain extent as it is cooled, it has been found that after repeated autoclaving, the tubular elements have become loose in the plastic barrel so that the dropper assembly must be discarded.

With the foregoing problems of prior art structure in view, it is therefore the individual and collective objects of this invention to provide an improved device for dispensing drops of uniform and accurately predetermined volumes in which:

(a) accurate alignment between the tubular dropper element and the barrel can be maintained using commercially practical manufacturing techniques, (b) the surface area and angle of flare of the frustoconical drop forming surface on the tubular element can be maintained within the required tolerances utilizing normal manufacturing techniques, (c) the necessary uniformity of cross-sectional area and circularity of the bore of the tubular element at its juncture with the frustoconical drop forming surface is maintained so that the bore can be cleaned when required, (d) the fluid tight seal between the plastic barrel and metal tubular drop forming element will not deteriorate as the result of repeated autoclaving, (e) the drop forming tubular element is detachably secured to the barrel so that it can be removed for cleaning and then replaced, (f) the tubular drop forming element about its frustoconical drop forming surface is sufficiently strong and rigid that the drop forming surface will not be distorted and its calibration thereby destroyed in normal handling by laboratory personnel, (g) the exterior surface of the tubular dropper element intersects the frustoconical drop forming surface in a circular line and tapers inwardly toward the axis of the drop forming surface so that the exterior surface of said drop forming element immediately adjacent said drop forming surface is of lesser cross-section normal to the axis of the drop forming surface so that the frustoconical surface forms the sole surface to which liquid within a drop can adhere during formation of the drop, and (h) the parts can be readily and economically manufactured and maintained in their desired design configuration to produce the required accuracy and uniformity of drop volume throughout the extended periods of use.

These and other objects of the present invention will become more fully apparent by reference to the appended claims and as the following detailed description proceeds in reference to the accompanying scale drawings wherein:

FIGURE 1 is a longitudinal cross-sectional view taken through the axis of a dispenser constructed in accord with the principles of the present invention;

FIGURE 2 is an enlarged view of the lower end of the barrel of the dispenser of FIGURE 1 showing the structure thereon by which the tubular element is aligned and sealed with respect thereto;

FIGURE 3 is an enlarged cross-sectional view of the tubular drop forming element of the dispenser as illustrated in FIGURE 1;

FIGURE 4 is a view similar to FIGURE 3 illustrating a tubular drop forming element adapted to produce a series of drops of uniform volume substantially less than the volume of the drops produced by the tubular drop forming element as illustrated in FIGURE 3; and FIGURE 5 is a view showing a modified construction of the lower end of the barrel and the tubular drop forming element of the dispenser providing a seal and mechanical connecting therebetween which precludes physical disassembly of the two during autoclaving as a result of their differential expansions.

Referring now in detail to the drawings and particularly to FIGURE 1, the dispenser or dropper assembly 10 there shown comprises a tubular metal drop forming element 12, an elongated plastic pipette or barrel 14, and a plastic suction filter adaptor 16 interfitting in the top of the pipette 14 and supporting an axially porous disposable cellulose acetate filter cartridge 18. As the purpose, structure and operation of the filter adapter 16 and the cartridge 18 are identical with the corresponding parts illustrated and described in said co-pending application Serial No. 135,364, further detailed description of them is not deemed necessary here.

The pipette or barrel 14 is an elongated tubular member having a reduced section 20 of sufficient axial length and sufficiently small cross-sectional area that it may be inserted into a conventional 75 millimeter test tube to extract all of the liquid content thereof. The upper section 22 of the barrel 14 is of sufficiently larger diameter and sufficient length that the combined volumetric capacity of the sections 20 and 22 permit withdrawal of substantially the entire content of such a conventional test tube into the dispenser. As is most clearly illustrated in FIGURE 2, the extreme lower end of the barrel 14 is of reduced cross-section having a cylindrical passage 24 opening at its upper end through a diverging conical section 26 into the main chamber 28 of the section 20 of the barrel 14. This end section has externally a series of annular ribs 30, 32 and 34 spaced axially therealong. These ribs coact with the internal surface 36 of the tubular dropper element 12 in assembly as shown in FIGURE 1 to provide a fluid tight labyrinth seal between the tubular element 12 and the barrel 14. By this construction, the tubular element 12 can be removed from and replaced upon the barrel 14 repeatedly without destruction of the seal between the barrel 14 and the tubular element 12.

As is apparent in FIGURE 2, the external surface 38 of the end section of the barrel 14 is tapered and terminates in a radial shoulder 40 against which the tubular element 12 is seated in assembly as shown in FIGURE 1.

In one illustrative embodiment of the present invention, the overall length of the barrel or pipette 14 is 5.50 inches, the length of the section 20 from the end of the pipette or barrel 14 is 2.50 inches, the diameter of the passage 24 is .093 inch, the diameter of the ribs 30, 32 and 34 is .175 inch plus .002 inch minus .000 inch, the axial length of each rib 30, 32 and 34 is .05 inch, the external diameter of the section 20 is 2.65 inch±.005 inch, the external diameter of the section 22 is .500 inch±.005 inch and the wall thickness of the barrel 14 throughout the sections 20 and 22 is typically .030 inch. The pipette 14 is preferably formed of polypropylene.

The barrel 14 is preferably formed by injection molding. The diameter of the passage 24 is sufficiently great that the core pin necessary to provide this passage has sufficient strength and rigidity that the passage 24 will remain uniformly in coaxial alignment with the remainder of the barrel or pipette 14. Further it will be noted that alignment between the pipette 14 and the tubular drop forming element 12 is established by the external ribs 30, 32 and 34. These surfaces are established by the internal surfaces of the mold cavity so that their dimensions and locations can be readily maintained within the prescribed tolerances during the injection molding process.

As is apparent from reference to FIGURE 3, the tubular drop forming element has a through cylindrical bore 42 which is enlarged at the upper end to provide a cylindrical chamber defined by the surface 36 into which the lower end of the barrel 14 fits as illustrated in FIG. 1. The lower end of the bore 42 opens directly into the frustoconoidal, preferably frustoconical concave surface 44 which is in coaxial alignment therewith. The surface 44 intersects the exterior surface of the drop forming element 12 in a circular line at 46. Immediately adjacent this line, the exterior surface of the element 12 has a cylindrical section 48 and a conical section 50 having its apex on the axis of and within the bore 14 above the apex of the surface 44 and an annular shoulder 52 by which the surface 50 is connected to the cylindrical surface 54 which extends over the major portion of the length of the drop forming element 12.

The drop forming element as illustrated in FIGURE 3 is designed to produce a series of drops each having a volume of .050 milliliters with an accuracy of ±2½%. Specifically the accuracy of the dropper is 40 drops ±1 drop per 1 milliliter of liquid. For this capacity dropper, the cone angle of the surface 44 is preferably 60 degrees, the half cone angle of the surface 50 is preferably 12 degrees, the axial length of the cylindrical surface 48 is .010 inch, the diameter of the circular line 46 and the surface 48 is .119 inch plus .0005 inch minus .0000, the over-all length of the tubular element 12 is 1.03 inch, the axial length of the surface 36 is .281 inch, the diameter of the surface 36 is .173 inch plus .002 inch, minus .000 inch and, the diameter of the bore 42 is .035 inch. To provide adequate wall thickness surrounding the bore 42, the diameter of the cylindrical surface 54 is in this embodiment .125 inch.

The embodiment illustrated in FIGURE 4 is designed to produce drops of a volume of .025 milliliter with the same degree of accuracy as the embodiment illustrated in FIGURE 3. Since the basic elements of the dropper element 12 of FIGURE 3 and the dropper element 12a of FIGURE 4 are the same, the same reference numerals have been used with the addition of the letter a to distinguish the corresponding parts of the latter embodiment. The dimensions of the embodiment shown in FIGURE 3 except that the diameter of the circular line 46a and the cylindrical surface 48a is .055 inch plus .0005 inch minus .0000 inch, the diameter of the cylindrical surface 54a is .12 inch, the half cone angle of the frustoconical surface 50a is 4 degrees and the diameter of the circular intersection of the surfaces 50a and 52a is .045 inch rather than the .090 inch diameter of the intersection of the surfaces 50 and 52 of the embodiment of FIGURE 3.

In both embodiments, the tubular drop forming elements 12 and 12a are preferably formed of Type 303 stainless steel, formed entirely on an automatic screw machine, thereafter annealed and passivated. The annealing operation eliminates the magnetism resulting from cold working of the material while the tubular drop forming element is being produced on the screw machine and passivating removes foreign particles on the surface of the tubular drop forming element resulting from tool erosion during the machining process. As a final step, the tubular drop forming element is electroplated with a very thin coating of gold, known as gold flash.

The structure illustrated in FIGURE 5 is identical with that illustrated in FIGURES 1, 2 and 3 except that the counterbore 36 is formed with 10-24 NC-2B internal threads and the external surface 38 of the end section of the barrel 14 is formed with 10-24 NC-2A external threads undercut adjacent the radial shoulder 40 for an axial length of .040 inch, the overall length of the threaded section plus the undercut being .50 inch±.005 inch. The structure illustrated in FIGURE 5 is an improvement over that illustrated in FIGURES 1, 2 and 3 in that, by providing a threaded connection between the drop forming element 12 and the barrel or pipette 14, the two can be placed in assembled relation as illustrated in FIGURE 1 in an autoclave and sterilized without disassembly. In the structure illustrated in FIGURES 1, 2 and 3 during autoclaving, it is possible for the drop forming element 12 to drop off of the pipette 14 due to the greater expansion of the metal drop forming element 12 than of the plastic barrel 14. In the embodiment shown in FIGURE 5, while the difference in expansion remains, the threads are such as to maintain the drop forming element 12 and the pipette 14 mechanically assembled so that, upon cooling, the seal is reestablished and the parts maintained in their normal assembled relation.

As is apparent from the foregoing description, the dropper assembly or dispenser of the present invention eliminates the difficulties found in prior constructions as described above. The passage 24 is of large diameter so that it can be accurately formed. The alignment and seal between the barrel 14 and the drop forming element 12 are both provided by external surfaces on the barrel 14 which is formed of plastic and internal surfaces on the drop forming element 12. Thus the surfaces on the molded plastic part 14 which establish alignment of that part with the dropper 12 may be accurately located. While the differential in the coefficients of expansion of the plastic part 14 and the metal part 12 still exist, the part having the larger coefficient of expansion, the tubular drop forming element 12, surrounds the plastic part 14. When the two parts are placed in assembled relation as shown in FIGURE 1 in an autoclave and heated, the greater expansion of the part 12 may provide a clearance between the parts 12 and 14 while at their elevated temperature within the autoclave but there is no permanent distortion of the plastic barrel 14. As the parts cool, they will both contract and a seal will be reestablished.

The tubular element 12 being so designed that it can be formed entirely on an automatic screw machine, can be made by normal commercial practices to the specified tolerances necessary to produce the required degree of accuracy and uniformity in the volume of the successive drops. The juncture between the surface 44 and the bore 42 is not distorted during the machining process either from circularity or to a smaller diameter than that of the bore 42. The external surfaces 48 and 50 intersect the drop forming surface 44 in a circular line 46 so that the surface 44 is the sole surface to which liquid in a drop will adhere during the formation of that drop thereby assuring that the cone angle and surface area of the surface 44 are the sole factors determinative of the volume of the drops to be formed. Since the part is designed so that it can be manufactured on a screw machine, these factors can be maintained within the specified tolerances. The cone angle for the surface 50 and the axial length of the cylindrical surface 48 are such that the wall thicknesses between those surfaces and the surface 44 is sufficiently great that the edge represented by the circle 46 will not be distorted in normal usage such as by placing the drop forming element 12 carelessly upon a laboratory table or placing the drop forming element individually or with the pipette barrel 14 in a basket for autoclaving.

Since the bore 42 is cylindrical throughout its length and since the parts 12 and 14 are readily detachable and reassemblable, the drop forming element 12 may be cleaned in the event that the bore 42 becomes wholly or partially clogged and in the event that either of the parts 12 or 14 become damaged, either may be replaced.

The result of these advantages is that this unit may be manufactured much less expensively and much more dependably and is much less delicate and much more practical from the viewpoint of the laboratory technician.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An accurately metered drop dispenser suitable for use in performing microtitrations and which may be readily sterilized for reuse, said dispenser comprising: an elongated barrel defining a reservoir and formed of a first material which is resistant to permanent deformation at sterilizing temperature and has a first coefficient of thermal expansion, said barrel having openings at each end; a tubular dropper element attached to said barrel at one end to form an extension thereof and formed of a second material having a second coefficient of thermal expansion greater than that of said first material and which is also resistant to permanent deformation at sterilizing temperatures; said dropper element having a through bore which is enlarged at one end to embrace the exterior of said barrel one end, said dropper element through bore having an outwardly flared conoidal concave surface at its opposite end providing the sole surface of said dispenser to which liquid within a drop being formed can adhere by surface tension during formation of such a drop by passage of liquid from said reservoir through said through bore to said element opposite end; said dropper element through bore having also an elongated cylindrical intermediate portion of no greater diameter than the diameter of the opening of said barrel one end whereby, upon assembly of said dropper element on said barrel one end, said dropper element bore intermediate portion forms a fluid passage extension of the opening through said barrel one end; the exterior surface of said dropper element at said opposite end intersecting said concave surface in a circular line and intersecting the plane defined by said circular line substantially perpendicularly thereby precluding variation in the volume of a drop being formed on said conoidal concave surface incident to adhesion of liquid to an exterior surface of said dropper element, and means on the engaged surfaces of said bore one end and said barrel one end forming a fluid tight seal between said barrel and said dropper element and maintaining said barrel and element in assembly at normal ambient temperatures while permitting relative differential radial expansion thereof as they are simultaneously heated to sterilizing temperatures.

2. The dispenser defined in claim 1 wherein said barrel is formed of a substantially rigid synthetic plastic and has at least one radially elastically deformable rib at its said one end engaging the interior surface of said bore one end in fluid tight relation.

3. The dispenser defined in claim 2 wherein said barrel has a plurality of concentric axially spaced radially elastically deformable ribs at its said one end engaging the interior surface of said bore one end in fluid tight relation to provide a labyrinth seal and to assure accurate alignment between said dropper element and said barrel.

4. The dispenser defined in claim 1 including means on the engaged surfaces of said element and barrel for establishing and maintaining the axes of said element and barrel in alignment.

5. The dispenser defined in claim 1 wherein the exterior surface of said dropper element at said opposite end tapers inwardly from said line toward the axis of said tube so that said line is the portion of said element of greatest cross-section at and immediately adjacent said element opposite end.

6. The dispenser defined in claim 5 wherein said exterior surface is frustoconical.

7. The dispenser defined in claim 1 wherein said seal forming means is of pressure sensitive construction so that said element and barrel may be separated for cleaning purposes and reassembled by pressure to reestablish the fluid tight seal therebetween.

8. The dispenser defined in claim 1 wherein the juncture of said conoidal concave surface and the remainder of the bore of said element is a circle so that a cylindrical cleaning tool can be readily inserted through said bore.

9. The dispenser defined in claim 1 wherein the wall thickness of said tubular element surrounding said concave conoidal surface is sufficiently great to preclude distortion of said conoidal surface during normal usage.

10. The dispenser defined in claim 1 wherein said fluid tight seal forming means between said barrel and said dropper element comprise engaged internal and external threads on the barrel and dropper element respectively positively interlocking and precluding disassembly of the barrel and dropper element during sterilization of the assembly incident to their differential expansions.

11. The dispenser defined in claim 10 wherein said barrel is formed of a substantially rigid synthetic plastic and wherein said dropper element is formed of a metal and has a substantially higher coefficient of thermal expansion than the coefficient of thermal expansion of the plastic of which said barrel is formed.

References Cited by the Examiner

UNITED STATES PATENTS

| | | | |
|---|---|---|---|
| 3,009,610 | 11/1961 | Kubiliunas | 222—548 X |
| 3,016,722 | 1/1962 | Batdorf | 277—208 X |

FOREIGN PATENTS

| | | |
|---|---|---|
| 821,258 | 8/1937 | France. |

ROBERT B. REEVES, *Primary Examiner.*

HADD S. LANE, *Examiner.*